United States Patent [19]
Day et al.

[11] Patent Number: 5,945,056
[45] Date of Patent: Aug. 31, 1999

[54] METHOD OF MAKING A SURGICAL SIMULATOR

[75] Inventors: Ralph Paul Day, West Linton; Aaron Sherman, Chigwell, both of United Kingdom

[73] Assignee: Simutech Limited, United Kingdom

[21] Appl. No.: 08/864,982

[22] Filed: May 28, 1997

[51] Int. Cl.[6] ............................ B29C 33/40; B29C 33/60
[52] U.S. Cl. ......................... 264/250; 264/222; 264/335; 264/DIG. 30; 434/267; 434/268; 434/272
[58] Field of Search ............................ 264/222, DIG. 30, 264/334, 250, 335; 425/2, 438; 249/63

[56] References Cited

U.S. PATENT DOCUMENTS

| | | | |
|---|---|---|---|
| 2,324,702 | 7/1943 | Hoffmann et al. | 35/17 |
| 3,852,893 | 12/1974 | Smrcka | 35/17 |
| 5,320,537 | 6/1994 | Watson | 434/272 |
| 5,620,326 | 4/1997 | Younker | 434/268 |

Primary Examiner—Jan H. Silbaugh
Assistant Examiner—Suzanne E. Mason
Attorney, Agent, or Firm—Melvin I. Stoltz

[57] ABSTRACT

A method of making a surgical simulator comprises first and second mouldings which can be assembled together to form a simulation limb. The first moulding is in the form of a replaceable cartridge on which simulation surgical operations moulding can be performed. The second moulding is mounted on a supporting base and includes a cavity within which the first moulding can be located. A housing containing a pump assembly is mounted on the supporting base and the pump assembly is arranged to pump simulation blood through a simulation vein contained within said first moulding.

10 Claims, 5 Drawing Sheets

5,945,056

METHOD OF MAKING A SURGICAL SIMULATOR

FIELD OF THE INVENTION

This invention relates to simulators and is concerned with a method of making a simulator for use by surgeons when carrying out peripheral bypass surgery.

An angioscopically guided coil delivery catheter system has been developed for intraluminal embolisation of venous tributaries of the saphenous vein during in situ peripheral bypass surgery. The use of such system has been described in the following publications, to which reference should be made: Maini et al. "A modified, angioscopically assisted technique for in situ saphenous vein bypass: Impact on patency, complications, and length of stay", Journal of Vascular Surgery, Volume 17, Number 6, pages 1041 to 1049, and Robert P. Leather et al. "Not all in situ bypasses are created equal", Chapter 31, pages 391 to 403 of the book entitled "The Ischemic Extremity Advances in Treatment".

A functionality simulator is required to replicate the key stages in undertaking this type of surgical intervention in order that clinicians may become familiar with the procedure itself and with the instrumentation which has been designed for carrying out this procedure. It is accordingly a specific object of the present invention to provide a method of making such a simulator.

SUMMARY OF THE INVENTION

According to the present invention there is provided a method of making a surgical simulator, which method includes producing first and second mouldings which can be assembled together to form a simulation limb, the first moulding being in the form of a replaceable cartridge on which simulation surgical operations can be performed and the second moulding including a cavity within which the first moulding can be located, said first moulding including a simulation vein having a plurality of vein tributaries and a plurality of venous valves.

Said first moulding is preferably produced in a two-stage moulding procedure, in the first stage of which a tool is placed within a mould, which tool includes:

a) a tapered elongated rod simulating the vein, b) a plurality of slots cut into the rod, and c) a plurality of side branches releasably connected to the elongated rod.

The slots are formed at those locations corresponding to the locations of valves within the vein and the side branches are formed at those locations corresponding to the locations of the vein tributaries.

After the tool has been positioned within the mould, a silicone rubber polymer is preferably poured into the mould and the tool is removed after the polymer has fully cured. Removal of the tool is preferably effected by first withdrawing the side branches and then withdrawing the rod from the end thereof of maximum dimensions without rupturing the valves formed by entry of the silicone polymer into the slots.

The tool is preferably pre-coated with a spray-applied silicone release agent prior to it being placed within the mould. After casting and curing of the silicone polymer, the tool is preferably lubricated using a mixture of methyl cellulose, distilled water and a preservative which is injected around the entrances to the main vein and to each of the vein tributaries prior to removal of the side branches.

After removal of the tool from said first-stage moulding, adaptors are preferably fitted in the apertures through which the side branches have been withdrawn and the adaptors are then connected to each other by connectors to form a flow circuit.

The second stage of the moulding process preferably includes placing the first-stage moulding fitted with the adaptors and connectors into a mould which is then filled with a silicone polymer.

The silicone polymer which is used preferably comprises a 70:30 mixture of a silicone base elastomer and silicone oil.

DESCRIPTION OF THE PREFERRED EMBODIMENTS

Figure 1:
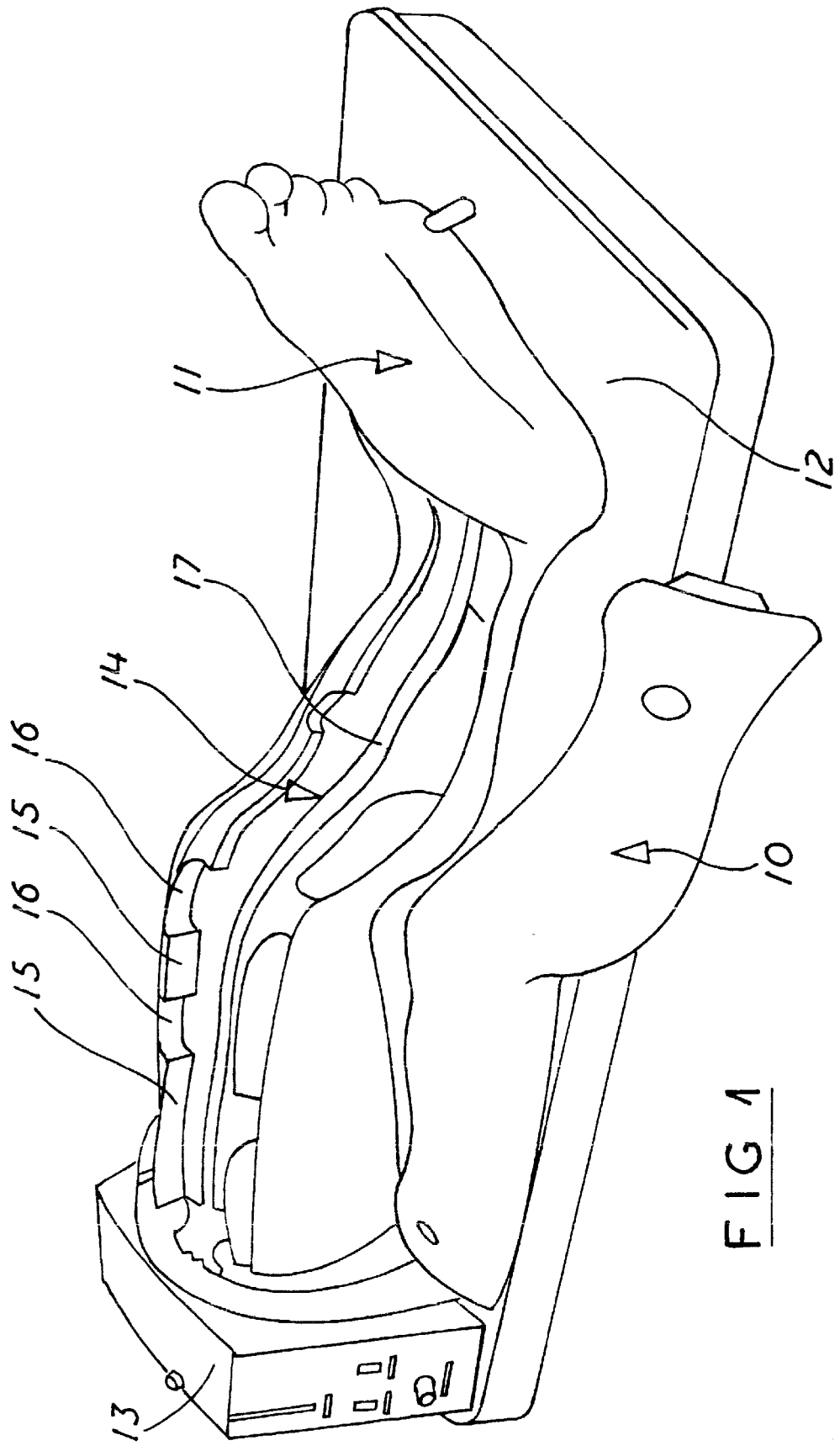
FIG. 1 is a perspective view of a leg simulator showing the two plastic mouldings separated from one another.

As shown in FIG. 1, the surgical simulator comprises first and second plastic mouldings 10 and 11 each produced using suitable silicone polymers so that together they provide a realistic simulation of a leg. The second moulding 11 is mounted on a supporting base 12 and, at the groin end, is connected to a housing 13 within which a pump unit (not shown) is contained, the pump unit comprising two pumps which are operable in use of the simulator to pump simulation blood through the flow passages contained in the leg. One of the pumps is so designed as to provide an adjustable pulse rate so as to simulate actual surgical conditions.

Moulding 11 is shaped, as shown, to provide an elongated cavity 14 within which the first moulding 10 is received as a close fit, the sides of the cavity 14 being defined by alternate projections 15 and recesses 16 and the base of the cavity 14 including a channel 17 in which a corresponding rib (not shown) on moulding 11 is received. Moulding 10 is in the form of a disposable cartridge which is used for one simulation surgical procedure and is then discarded. It is inserted in the cavity 14 and connected to supply and return pipes leading from the pump unit contained within the housing 13. The Shore Hardness of the silicone polymer from which the second moulding 11 is formed is significantly greater than that of the polymer from which the first moulding 10 is formed. As moulded, as described below, the first moulding is substantially straight but, when fitted in the cavity 14, it adopts the configuration of the cavity 14 and the configuration of the simulation saphenous vein is caused to conform substantially to that of an actual saphenous vein.

Figure 2:
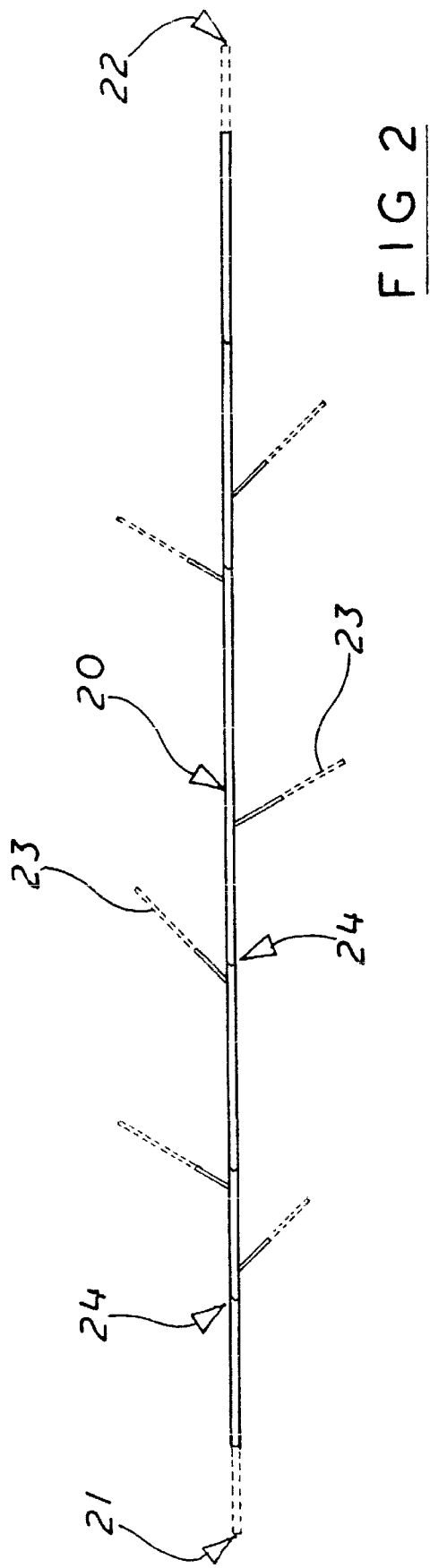
FIG. 2 is a plan view of the simulation saphenous vein showing its valves and tributaries.
Figure 3:
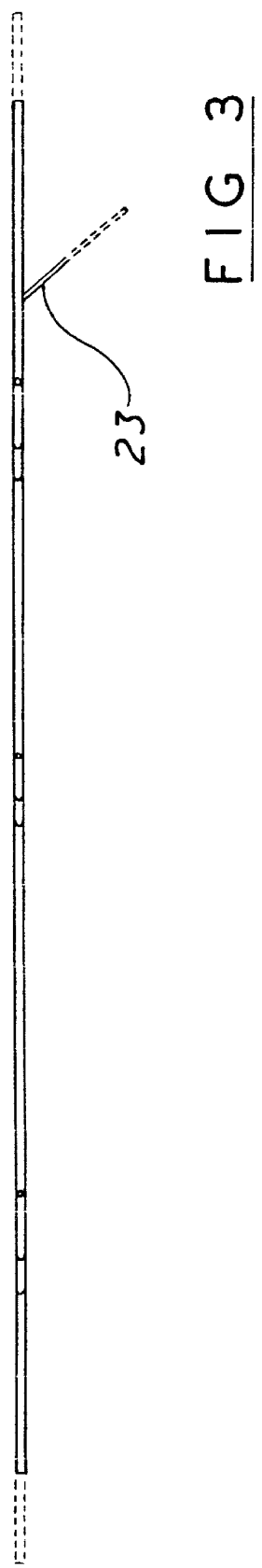
FIG. 3 is a side view of the simulation saphenous vein.

Turning next to FIGS. 2 and 3, these show the main tool 20 used in the first stage of producing the first moulding 10. The tool 20 is manufactured, on an off-centre lathe, from a stainless steel alloy and is in the form of a solid rod which tapers from the "groin" end 21 to the "ankle" end 22, having a diameter of 5.5 mm. at the "groin" end 21 and a diameter of 4.5 mm. at the "ankle" end 22. This represents the structural morphology of the saphenous vein, i.e. the main vein in the human leg.

Seven precision-turned stainless steel side-branch tools 23 are push-fitted into bores drilled in the main tool 20. The side branch tools 23 are located at defined positions and inclusion angles along the length of the main tool 20. These side branch tools 23 represent the structure of the principal side branch veins which feed into the saphenous vein.

Figure 4:
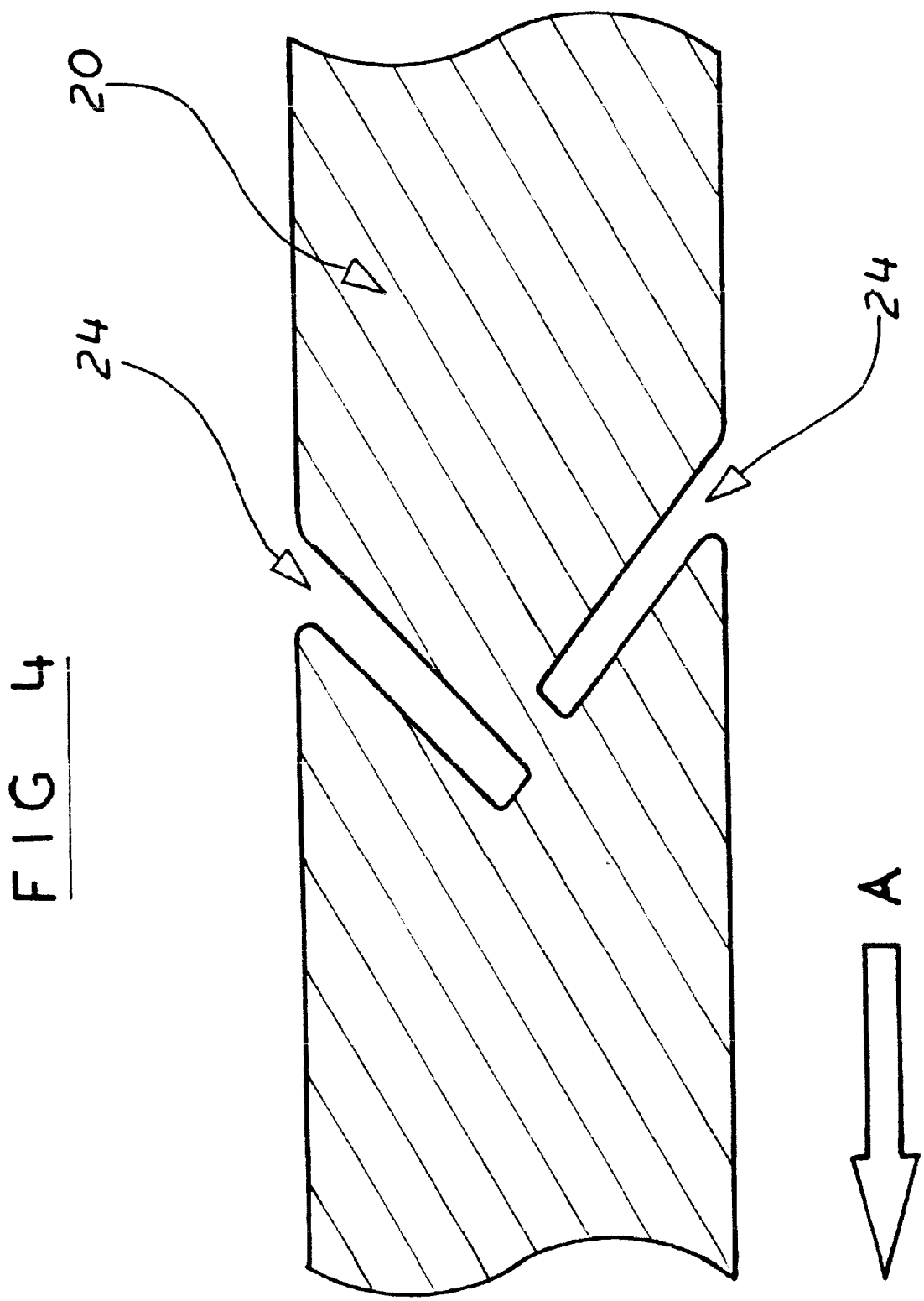
FIG. 4 is a detail view showing part of the tool used in production of the simulator.

Pairs of V-shaped grooves 24 are then precision-cut into the main tool 20 (as indicated in FIG. 4) to represent the morphology and functions of the valve mechanisms within the saphenous vein. As shown in FIG. 4, the grooves forming each pair of grooves 24 are off-set axially of the main tool 20. Each groove is in the form of a parallel-sided slot with the space between the closest contact points of the two slots greater than the width of a slot. The entrances to the slots are chamfered and polished, with all the slot surfaces highly polished to ensure the complete absence of any machining marks or swarf.

The complete tool is then coated with a spray-applied release agent and then embedded within the negative recess of a two-part mould and a customised silicone polymeric rubber is poured into the mould and allowed to set. The chosen polymer is derived from a 70:30 mixture of a silicone base elastomer and a silicone oil, thereby obtaining the required flexibility and strength characteristics.

When the silicone rubber has fully cured, for example, after twenty four hours, the tool is removed from the formed moulding in a defined sequence. As a first step, the tool is lubricated using a mixture of methyl cellulose, distilled water and a preservative, which is injected around each side branch tool 23 prior to removal of the side branch tools 23 in turn. When each of the side branch tools 23 has been removed, the lubrication process is repeated through the channels left by removal of the side branch tools 23 to ensure complete lubrication of the main tool 20 which is then removed very carefully from the "groin" end of the tool upwards, i.e. in the direction indicated by the arrow A in FIG. 4, to ensure that the valves formed by the silicone material entering the grooves 24 are not disrupted.

A first-stage moulding is thus produced in the form of a solid polymeric block comprising an inner cartridge assembly 25 (FIG. 5) formed with a main tunnel (which corresponds to the saphenous vein) and seven side tunnels (which correspond to the side branch veins).

Figure 6:
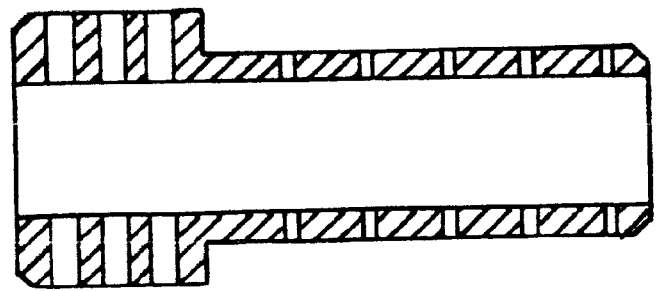
FIGS. 6 and 7 show two adaptors used in the production of the simulator.
Figure 7:
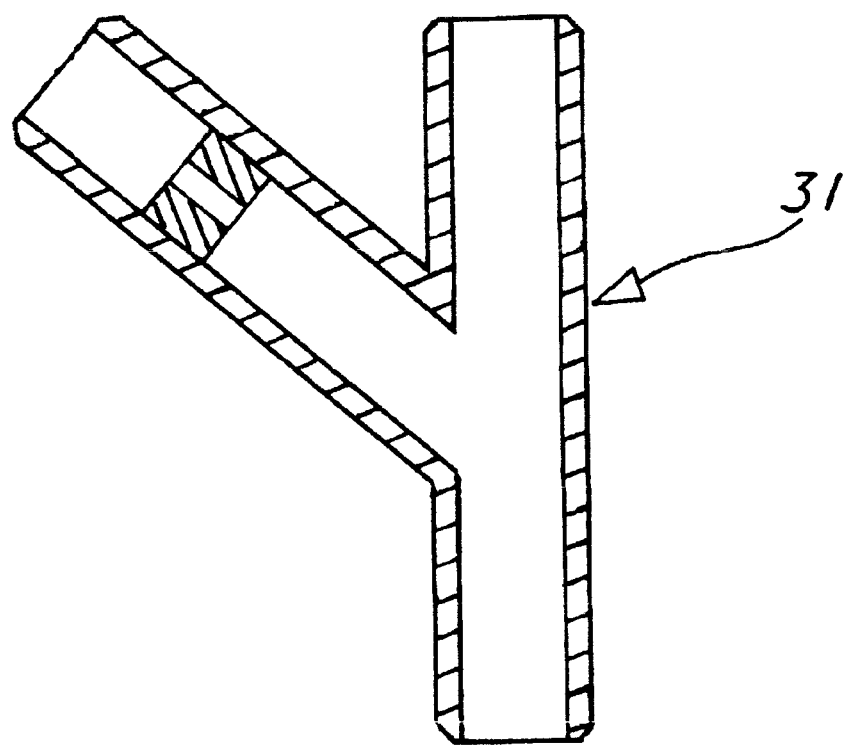

After removal of the tooling, this inner cartridge assembly is left to stand for a further twenty four hours. Each main and side tunnel end is then push-fitted with a customised hollow adaptor such as those shown as 30 and 31 in FIGS. 6 and 7 respectively. Adaptor 30 is an out-flow adaptor which is fitted into the "groin" end of the main tunnel. Adaptor 31 is fitted into the end of the first of the side tunnels, similar adaptors 32 to 37 (se FIG. 5) being fitted into the outer ends of the other side tunnels. The adaptors 30 to 37 are formed as mouldings from pvc or nylon of defined bore and outside diameter. The adaptors 31 to 36 are of defined inclusion angle while adaptor 37 is in the form of a T-piece. Each of the adaptors 31 to 37 contains a precision-drilled flow restrictor 32 to simulate the physiology of the flow characteristics of venous blood within the human leg.

The flow circuit is finely balanced (once the blood flow circuit is completed as described below) to such an extent that it is possible to simulate the phenomenon of "backflow" of blood into the main saphenous vein, should a side branch vessel be occluded by disease, or by the placement of an artificial prosthesis specifically designed to occlude the vessel.

Figure 5:
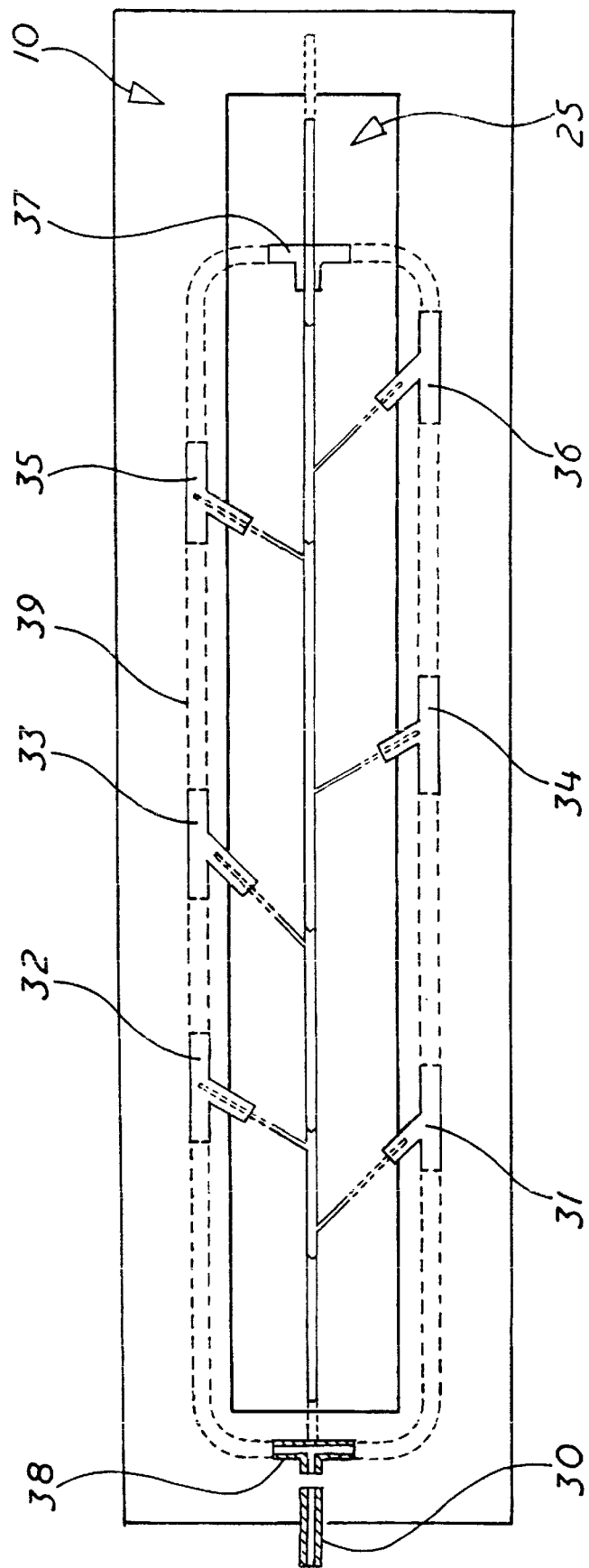
FIG. 5 shows two stages in the production of the simulator.

FIG. 5 shows the inner cartridge assembly 25 fitted with the adaptors 30 to 37 and the adaptors are then connected together and to an out-flow connector 38 by means of pvc tubing 39. The inner cartridge assembly 25 plus fitted and connected adaptors 30 to 38 is then placed within an outer two-part mould which is filled with a silicone polymer which is then left and allowed to cure to form an outer cartridge assembly, i.e. the first moulding 10 shown in FIG. 1. When the outer cartridge assembly or first moulding 10 has been removed from the mould it is bent to the shape of the cavity 14 in the second moulding 11, to form a silicone polymer simulation of the complete human leg. Prefabricated, die-cast silicone, double-diaphragm washer assemblies (not shown) formed with off-set holes are then fixed into recesses within the first moulding 10 to provide a leak-proof seal around manipulating surgical instrumentation placed into the saphenous vein to facilitate the simulated surgical operation upon the vein by means of an angioscope, a miniaturised video camera used to relay the internal images of the vein to a television camera.

The outflow connector 30 and the inflow connector 38 are connected to inlet and outlet ports of the pump housing 13. One of the two pumps within the housing 13 is used for priming of the flow circuit, while the other pump is used to simulate the flow characteristics of a pulsed flow circuit through the vein system during the simulated surgical exercise. Controls are provided on the pump housing 13 which are operable for varying the pulse rate and, therefore, the flow characteristics. This enables the surgeon to perform the simulated surgery under varying degrees of difficulty and enables him to perform operations which, so far as possible, replicate actual surgical bypass procedures.

The fluid pumped through the system is designed to replicate the visual colour balance of deoxygenated blood when viewed through an angioscope and to provide the lowest possible coefficient of sliding friction within the simulated vessel walls to prevent the manipulating instruments from dragging and therefore damaging the vessel walls.

The formulation of the simulation blood may thus comprise:

Distilled Water,
Methyl Cellulose,
Colorants (FD&C Red 40 and Blue), and
Bronopol (2-bromo-2-nitropropane-1-3-diol) as preservative.

The present invention thus enables the production of a fully functional simulation of the human saphenous vein (containing internal valves and having side branches) on which simulation surgical operations can be carried out which closely replicate the situations which surgeons can encounter in practice, thereby enabling the surgeons to become conversant with the procedures involved in bypass surgery and the instrumentation used in carrying out such surgery.

We claim:

1. A method of making a surgical simulator, which method includes producing first and second mouldings which can be assembled together to form a simulation limb, the first moulding being in the form of a replaceable cartridge on which simulation surgical operations can be performed and the second moulding including a cavity within which the first moulding can be located, said first moulding including a simulation vein having a plurality of vein tributaries and a plurality of venous valves.

2. A method according to claim 1, which includes producing the first moulding by means of a two-stage moulding procedure, in a first stage of which a tool is placed within a mould, which tool includes:

a) a tapered elongated rod simulating the vein, b) a plurality of slots cut into the rod, and c) a plurality of side branches releasably connected to the elongated rod.

3. A method according to claim 2, in which, after the tool has been positioned within the mould, a silicone rubber polymer is poured into the mould and the tool is removed after curing of the polymer, removal of the tool being effected by first withdrawing the side branches and then withdrawing the rod from an end of the first stage moulding of maximum dimensions without rupturing the valves formed by entry of the silicone polymer into the slots.

4. A method according to claim 3, in which the tool is pre-coated with a release agent prior to it being placed within the mould and in which, after curing of the silicone polymer, the tool is lubricated using a lubricating fluid injected around the entrances to the main vein and to each of the vein tributaries prior to removal of the tool side branches.

5. A method according to claim 4, in which, after removal of the tool from said first-stage moulding, adaptors are fitted in apertures through which the side branches have been withdrawn and the adaptors are then connected to each other by connectors to form a flow circuit.

6. A method according to claim 5, which includes providing flow restrictors within each of said adaptors.

7. A method according to claim 5, in which said two-stage moulding process comprises a second stage which includes placing the first-stage moulding fitted with the adaptors and connectors into a mould which is then filled with a silicone polymer which comprises a 70:30 mixture of a silicone base elastomer and silicone oil.

8. A method of making a surgical simulator, which method includes producing first and second mouldings which can be assembled together to form a simulation limb, the first moulding being in the form of a replaceable cartridge on which simulation surgical operations can be performed and the second moulding including a cavity within which the first moulding can be located, said first moulding being produced by a two-stage moulding process in a first stage of which an inner cartridge assembly is formed, which inner cartridge assembly comprises a moulded block within which tunnels corresponding to a simulation blood flow system are disposed, fitting adaptors in the ends of the tunnels, connecting the adaptors together by connectors to form a flow circuit, and placing said inner cartridge assembly fitted with said adaptors and connectors in a mould for the carrying out of a second stage of the two-stage moulding process.

9. A method according to claim 8, in which the first stage of the two-stage moulding process comprises placing a tool within a mould, which tool includes a tapered elongated rod simulating a vein, a plurality of slots cut into the rod, and a plurality of side branches releasably connected to the elongated rod.

10. A method as claimed in claim 9, in which the plurality of slots are arranged in pairs and the slots of each pair of slots are positioned diametrically opposite and axially offset relative to one another.

* * * * *